US008626879B2

(12) United States Patent
Dham et al.

(10) Patent No.: US 8,626,879 B2
(45) Date of Patent: Jan. 7, 2014

(54) SYSTEMS AND METHODS FOR ESTABLISHING NETWORK CONNECTIONS USING LOCAL MEDIATION SERVICES

(75) Inventors: Vikram Dham, Fremont, CA (US); Padmanabha R. Rao, Palo Alto, CA (US)

(73) Assignee: Sling Media, Inc., Foster City, CA (US)

( * ) Notice: Subject to any disclaimer, the term of this patent is extended or adjusted under 35 U.S.C. 154(b) by 354 days.

(21) Appl. No.: 12/644,918

(22) Filed: Dec. 22, 2009

(65) Prior Publication Data
US 2011/0153718 A1    Jun. 23, 2011

(51) Int. Cl.
*G06F 15/177* (2006.01)

(52) U.S. Cl.
USPC .......................................................... 709/220

(58) Field of Classification Search
USPC .......................................................... 709/220
See application file for complete search history.

(56) References Cited

U.S. PATENT DOCUMENTS

| | | | |
|---|---|---|---|
| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |

(Continued)

FOREIGN PATENT DOCUMENTS

| CN | 1464685 | 12/2003 |
|---|---|---|
| DE | 4407319 A1 | 9/1994 |

(Continued)

OTHER PUBLICATIONS

European Patent Office, European Search Report for European Application No. EP 08 16 7880, mailed Mar. 4, 2009.

(Continued)

*Primary Examiner* — Alicia Baturay
(74) *Attorney, Agent, or Firm* — Ingrassia Fisher & Lorenz, P.C.

(57) ABSTRACT

Systems and methods facilitate communication between clients, servers or other nodes located on separate local area networks (LANs) or sub-networks within a home, office, campus or other environment using one or more mediation servers located within the local network environment. The server establishes a persistent connection to each available mediation service. The client requests a connection to the server by providing addresses or other connection information associated with the client to one or more of the mediation servers in communication with the server. The mediation server(s) send network information associated with the client to the server via the persistent connections. The server responds to the mediation server(s) by providing network information that can be relayed to the client. When the client and server have exchanged network information, communications between the client and server can be established using conventional or proprietary network address translation (NAT) or other techniques.

20 Claims, 3 Drawing Sheets

(56) References Cited

U.S. PATENT DOCUMENTS

Figure 1:
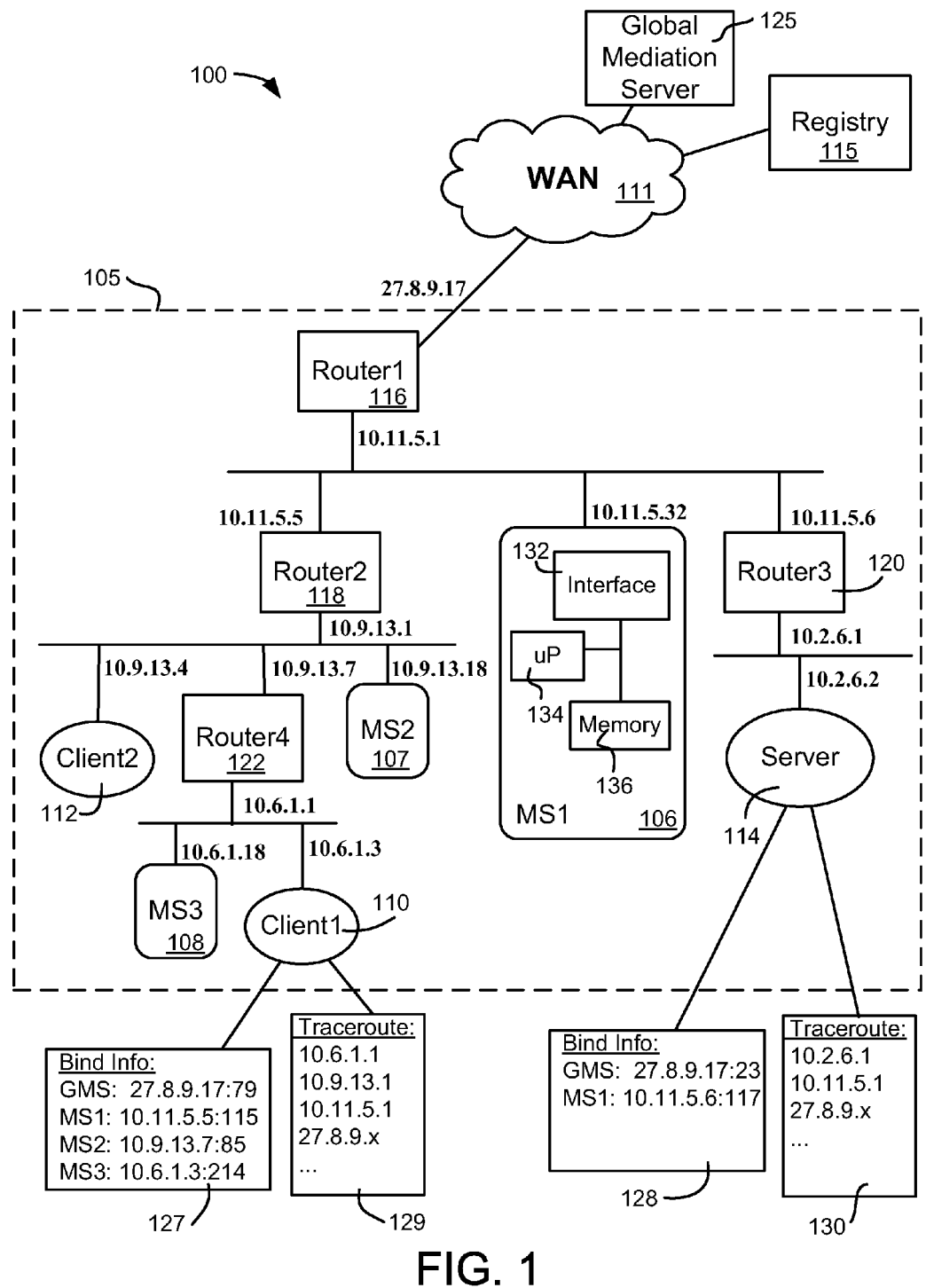

| | | |
|---|---|---|
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0055983 A1* | 5/2002 | Goddard ............. 709/217 |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0116475 A1* | 8/2002 | Berg ............. 709/219 |
| 2002/0122137 A1 | 9/2002 | Chen et al. |
| 2002/0131497 A1 | 9/2002 | Jang |
| 2002/0138843 A1 | 9/2002 | Samaan et al. |

(56) References Cited

U.S. PATENT DOCUMENTS

| | | |
|---|---|---|
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0010510 A1* | 1/2004 | Hotti ..................... 707/103 R |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0085579 A1 | 4/2006 | Sato |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0126619 A1* | 6/2006 | Teisberg et al. ............ 370/389 |
| 2006/0129676 A1* | 6/2006 | Modi et al. ................ 709/227 |
| 2006/0146174 A1 | 7/2006 | Hagino |
| 2006/0224719 A1* | 10/2006 | Eswaran et al. ............. 709/224 |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0157303 A1* | 7/2007 | Pankratov ..................... 726/11 |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0258718 A1 | 11/2007 | Furlong et al. |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0040446 A1* | 2/2008 | Meyer ........................ 709/217 |
| 2008/0059533 A1 | 3/2008 | Krikorian |
| 2008/0134267 A1 | 6/2008 | Moghe et al. |
| 2008/0195744 A1 | 8/2008 | Bowra et al. |
| 2008/0199150 A1 | 8/2008 | Candelore |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0199248 A1 | 8/2009 | Ngo et al. |
| 2009/0265541 A1* | 10/2009 | Ylitalo et al. ................ 713/151 |
| 2010/0011116 A1* | 1/2010 | Thornton et al. ............. 709/230 |
| 2010/0083312 A1 | 4/2010 | White et al. |
| 2010/0100915 A1 | 4/2010 | Krikorian et al. |
| 2010/0268832 A1* | 10/2010 | Lucas et al. .................. 709/228 |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| JP | 2003046582 A | 2/2003 |
| JP | 2004015111 A | 1/2004 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060741 10 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US2008/087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands;

(56) References Cited

OTHER PUBLICATIONS vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408,460, filed Mar. 20, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006,

(56) References Cited

OTHER PUBLICATIONS

XP002512495; retrieved from the Internet: <URL:http://www.slingcommunity.com/article/11791/Keyspan-Remote-Control—Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
Lucas, Brian et al. "Systems and Methods for Establishing Connections Between Devices Communicating Over a Network," U.S. Appl. No. 12/426,103, filed Apr. 17, 2009.
USPTO, Final Office Action, mailed Nov. 6, 2009; U.S. Appl. No. 09/809,868, filed Mar. 15, 2001.
Thiyagarajan, Venkatesan et al. "Always-On-Top Media Player Launched From a Web Browser," U.S. Appl. No. 12/617,271, filed Nov. 12, 2009.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Australian Government "Office Action," Australian Patent Application No. 2006240518, mailed Nov. 12, 2009.
Paul, John et al. "Systems and Methods for Remotely Controlling Media Server Via a Network," U.S. Appl. No. 12/645,870, filed Dec. 23, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox Pro-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Gangotri, Arun L. et al. "Systems, Methods, and Program Applications for Selectively Restricting the Placeshifting of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
China State Intellectual Property Office "First Office Action," issued Jan. 8, 2010, for Application No. 200810126554.0.

(56) References Cited

OTHER PUBLICATIONS

USPTO Final Office action mailed Jan. 25, 2010; U.S. Appl. No. 11/734,277, filed Apr. 12, 2007.
Gurzhi, Alexander et al. "Systems and Methods for Emulation Network-Enabled Media Components," U.S. Appl. No. 12/711,830, filed Feb. 24, 2010.
Jain, Vikal Kumar "Systems and Methods for Coordinating Data Communication Between Two Device," U.S. Appl. No. 12/699,280, filed Feb. 3, 2010.
"The Authoritative Dictionary of IEEE Standard Terms," 7th ed. 2000.
Newton's Telcom Dictionary, 20th ed., Mar. 2004.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
European Patent Office, International Searching Authority, "International Search Report," mailed Mar. 30, 2010; International Application PCT/US2009/068468 filed Dec. 27, 2009.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Japan Patent Office "Notice of Grounds for Rejection (Office Action)," mailed May 25, 2010; Patent Application No. 2007-0268269.
USPTO, Non-Final Office Action for U.S. Appl. No. 12/642,368, mailed Feb. 19, 2013.
USPTO "Non-Final Office Action" mailed Aug. 31, 2012 for U.S. Appl. No. 12/642,368, filed Dec. 18, 2009.

\* cited by examiner

400
SYSTEMS AND METHODS FOR ESTABLISHING NETWORK CONNECTIONS USING LOCAL MEDIATION SERVICES

TECHNICAL FIELD

The following discussion generally relates to systems and methods for establishing connections between devices using an intermediating service on a network.

BACKGROUND

Many devices commonly found in homes, offices and other settings are able to communicate with other devices over local area, wide area and other networks. In addition to conventional computer systems, many different types of televisions, television receivers, audio/video components, video game players, home appliances and many other devices now communicate using digital networks.

This connectivity has enabled a new generation of applications and other benefits to consumers. Recently, for example, consumers have expressed significant interest in "place shifting" devices that allow remote viewing of television or other media content at locations other than the viewer's primary television set. Place shifting devices typically packetize and transmit media content over a network to a computer, phone or other remote device that can play back the packetized media stream for the viewer. In addition to place-shifting, many other entertainment, monitoring/control and/or other networked applications are enjoying similarly widespread consumer interest.

Challenges frequently arise, however, in establishing communications between networked devices, particularly if the communicating devices are not located on the same physical network. To establish a media placeshifting session over a network, for example, a media player client typically contacts a content-providing server over the network to establish a streaming connection for the placeshifted media content. Challenges can arise, however, if the client does not know where to find the server on the network, or if a firewall or other routing device prevents direct access between the two devices. Similar issues can occur in establishing connections for video game players, audio/video components, home appliances and/or many other devices as well.

While several different types of services have been used to establish connections between clients located on the Internet or other wide area network (WAN) using network address translation (NAT) or similar "hole punching" techniques, such services have exhibited a number of disadvantages. In particular, as home and other networks become increasingly complicated, WAN-based services may be unable to distinguish between addresses provided by clients and servers that are both located on separate local area networks (LANs) behind a common router or gateway. As a result, if the two devices attempting to establish a connection are located on separate local area networks from each other and if both of those networks are separated from the connection service by a router, gateway or the like, then the WAN-based service may have difficulty establishing the connection between the two devices.

It is therefore desirable to create systems, devices and/or methods for reliably and conveniently establishing connections between clients and servers that are separated by one or more local area or other networks. These and other desirable features and characteristics will become apparent from the subsequent detailed description and the appended claims, taken in conjunction with the accompanying drawings and this background section.

BRIEF SUMMARY

According to various exemplary embodiments, systems and methods are provided to facilitate communication between two devices on a network through the use of a relatively local intermediating service. Systems and methods facilitate communication between a client and a server located on separate local area networks (LANs) or sub-networks within a home, office, campus or other environment using one or more mediation servers that may be located within the local network environment. The server node initially establishes a persistent connection to each available mediation service. The client requests a connection to the server by providing network addresses or other information to one or more of the mediation servers in communication with the server. The mediation server(s) send connection information associated with the client to the server via the persistent connections. The server responds to the mediation server(s) by providing connection information that can be relayed to the client. When the client and server have exchanged network information, communications between the client and server can be established using conventional or proprietary network address translation (NAT) or other techniques.

Various embodiments provide a method executable by a mediation server to facilitate communication between a client and a server. This exemplary method suitably comprises establishing a persistent connection between the mediation server and the server; receiving a request for a connection to the server from the client at the mediation server, wherein the request comprises first connection information associated with the client; sending the first connection information from the mediation server to the server via the persistent connection; receiving a response from the server at the mediation server, wherein the response comprises second connection information about the server; and sending the second connection information about the server from the mediation server to the client.

Other embodiments provide a system to establish communications between a client and a server over a network. The exemplary system suitably comprises an interface to the network and a processor. The processor is communication with the interface, and is configured to establish a persistent connection with the server via the interface, to receive a request for a connection that comprises first connection information associated with the client, to send the first connection information to the server via the persistent connection, to receive a response from the server that comprises second connection information about the server, and to send the second network information to the client.

Still other embodiments provide a method executable by a server to facilitate communications with a client. The exemplary method may suitably comprise: establishing a plurality of persistent connections, wherein each of the persistent connections is established with one of a plurality of mediation servers; receiving a request for a connection via at least one of the plurality of persistent connections, wherein the request comprises first connection information about the client; in response to the request, sending an address request to at least one of the plurality of mediation servers; receiving at least one network address associated with the server from each of the at least one of the plurality of mediation servers; and sending a response to at least one of the mediation servers, wherein the response comprises the at least one network address.

Various embodiments, aspects and other features are described in more detail below.

BRIEF DESCRIPTION OF THE DRAWING FIGURES

Figure 2:
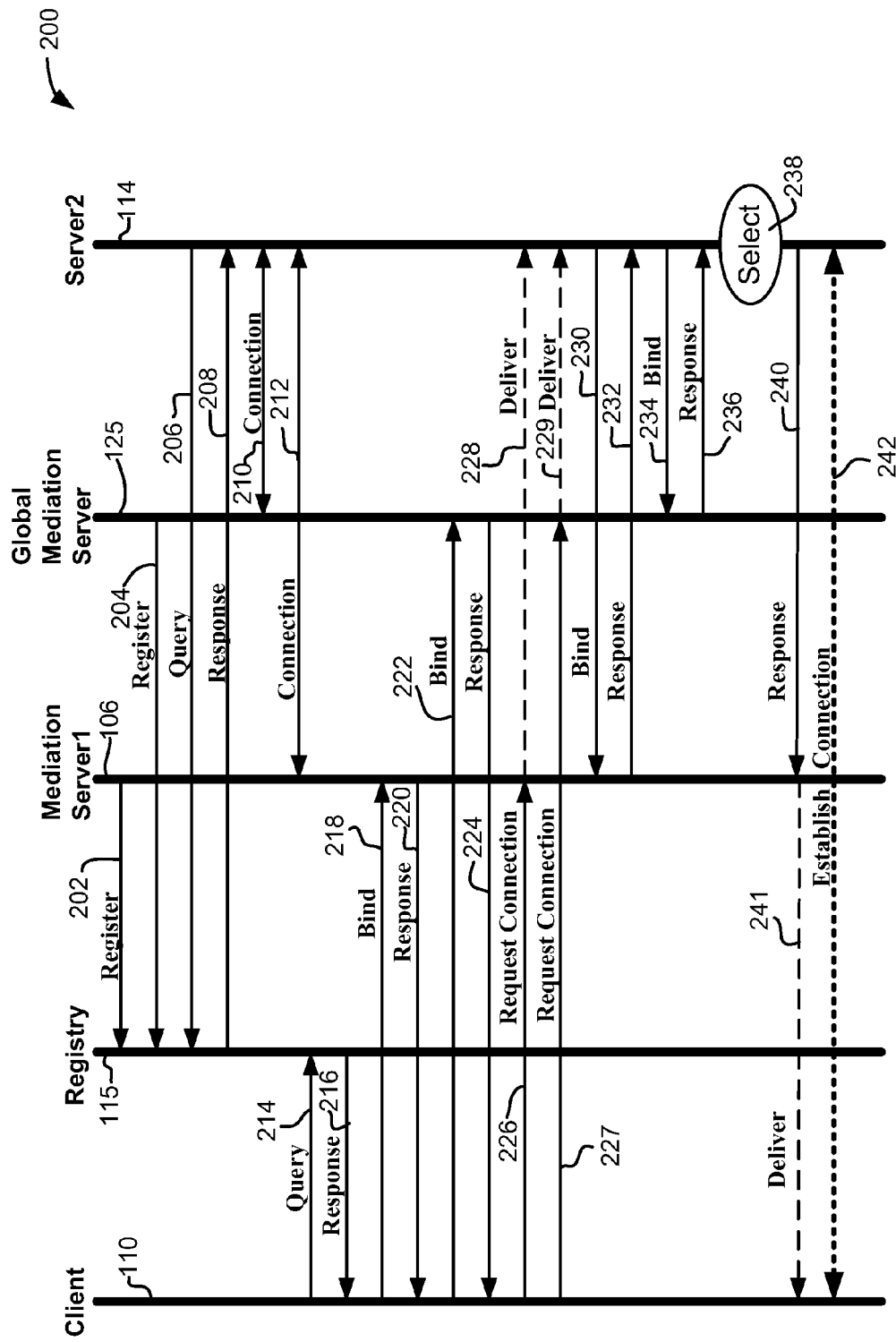
Figure 3:
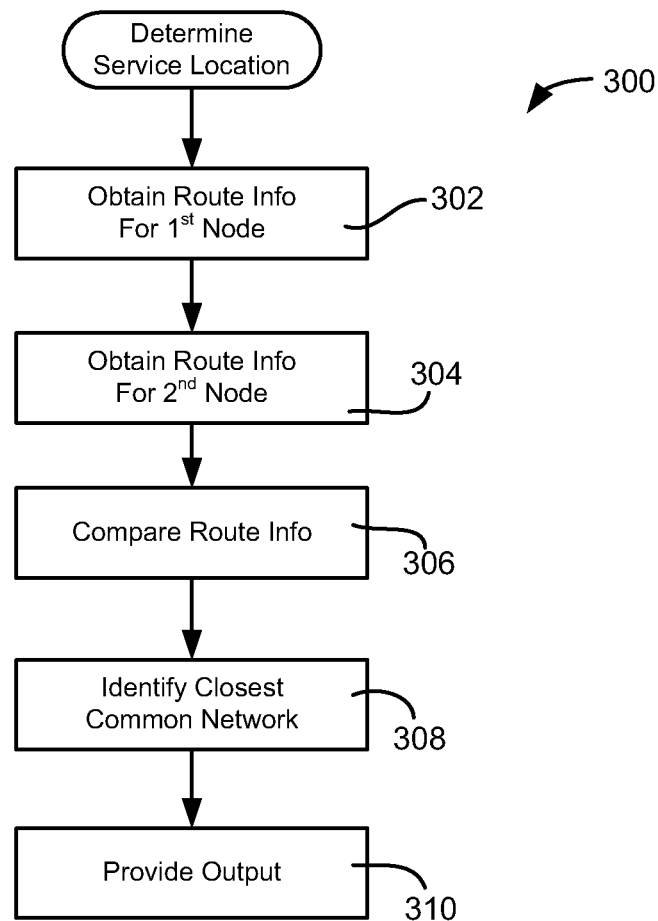

Exemplary embodiments will hereinafter be described in conjunction with the following drawing figures, wherein like numerals denote like elements, and FIG. 1 is a block diagram of an exemplary system for establishing and supporting communications over a network;

FIG. 2 is a process flow diagram of an exemplary process for facilitating communications between a two devices; and FIG. 3 is an exemplary process for identifying a network to deploy a local mediation server.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, systems and methods are provided to facilitate communication between two devices on a network through the use of a one or more local mediation services. These local mediation services may execute on a computer system, media device or other networked processor within a home, office, campus or other relatively close environment to mediate connections between clients and servers that may be located on separate LANs of the "home" network. If a firewall separates a home network from the Internet or another WAN, for example, one or more local mediation servers may be provided on the home network side of the firewall to facilitate communications between nodes located on different LANs or other sub-networks within the home network. By using one or more local mediation services, inter-LAN communications within a "home" network may be established even when WAN-based connection services are unavailable or ineffectual.

Although discussion often refers to placeshifting devices and techniques for convenience of illustration, equivalent embodiments could apply the same structures and techniques in any number of other settings. Indeed, the techniques described herein could be readily used to establish communications between any sorts of clients and/or servers or other nodes over any sort of network. Examples of such applications could include any sort of media streaming applications, video gaming, social networking, control or feedback applications, any sort of media sharing or storage applications, or any other application in which a client is attempting to establish a connection with a server located on a different LAN or other network.

Turning now to the drawing figures and with initial reference to FIG. 1, an exemplary system 100 for establishing a connection between one or more clients 110, 112, servers 114 and/or other devices within a home, office, campus or other network 105 suitably includes one or more local mediation servers 106, 107, 108. Each server 106-108 physically and logically resides within the home network 105 to facilitate communications between networked nodes, as described more fully below.

As shown in FIG. 1, one or more mediation servers 106-108 facilitate communications between clients 110, 112 and/or servers 114 on network 105 by providing a reliable channel through which communications can be established. To that end, each mediation server 106-108 is able to establish persistent connections with one or more servers 114, to receive connection requests from one or more clients 110, 112 that are attempting to contact server 114, and to facilitate exchanges of information between the client 110, 112 and server 114 so that the two parties may establish a direct connection with each other. A detailed description of one example of a process executed in some embodiments of mediation servers 106-108 is described in connection with FIG. 2 below.

Each mediation server 106-108 represents any sort of hardware, firmware and/or software capable of facilitating connections between other nodes within home network 105. Generally, each mediation server 106-108 is implemented in software or firmware that can be stored in any sort of memory, mass storage or other digital storage medium and that can be executed on any sort of microprocessor, microcontroller, digital signal processor or other processing logic as appropriate. Server 106 in FIG. 1, for example, shows an example of a mediation server that is provided by a device having a processor 134, a memory 136 and an interface 132 to a LAN, wireless LAN or other portion of network 105. In various embodiments, software or firmware instructions that perform the various tasks of mediation server 106 are at least temporarily stored in memory 136 prior to execution by processor 134. Interface 132 communicates with processor 134 to transmit and receive data communications on network 105. In various embodiments, interface 132 includes appropriate hardware, firmware and/or software to implement a network interface in accordance with IEEE 802.3, 802.11 and/or other any other standards. Various implementations of mediation server 106 may also include mass storage (e.g., a magnetic, optical or other disk drive) and/or other input/output features as appropriate.

Each mediation server 106-108 may be implemented using any network-enabled hardware. In some embodiments, one or more mediation servers 106-108 are implemented as conventional software modules executing on conventional desktop, laptop and/or other computing systems. Such software could be packaged with media player or other applications, for example, so that the mediation service is provided (e.g., by a daemon or other server process) when the computer system and/or application are active.

In other embodiments, any of mediation servers 106-108 may be implemented on embedded hardware devices that interface to any portion of network 105. Network-enabled televisions, displays, remote controls, media players, set-top boxes or other television receivers, video game players, network appliances and/or any other device hosts, for example, could provide mediation services in various embodiments. Still other embodiments may provide mediation services using routers (e.g., routers 116, 118, 120 and/or 122) and/or other network control devices as hosts for executing mediation server software. Mediation servers 106-108 may therefore be implemented in any dedicated or other host device using any sort of software or firmware logic that can be stored in memory (e.g., memory 136) and/or other storage, and that can be executed by any type of processor or controller circuitry (e.g., processor 134).

The exemplary network 105 shown in FIG. 1 shows several different physical or logical networks that are all interconnected using a series of routers 116, 118, 120, 122 to make up a "home" network 105. Generally speaking, home network 105 could represent any arrangement of two or more LANs or other sub-networks that are implemented within a home, office, campus, building, neighborhood or any other environment. In the embodiment shown in FIG. 1, router 116 connects a series of local area networks (LANs) connected by routers 118, 120, 122 to a wide area network (WAN) 111. WAN 111 may represent the Internet in some embodiments, and/or any other public, private, telephone or other network system based upon any set of protocols, including TCP/IP and/or any sort of telephony protocols. In the embodiment shown in FIG. 1, WAN 111 may allow nodes within home network 105 to communicate with any number of services, such as a global mediation server 125, a service registry 115 and/or the like. Such services may be provided using any conventional server or hosting hardware and/or software, including any sort of "cloud computing" services or the like.

"Routers" as described herein may represent any device or devices that are capable of interconnecting two or more local area or other networks, including any sort of wired and/or wireless networks. In various embodiments, routers 116, 118, 120 and/or 122 may be implemented with any sort of conventional network interconnection devices available from any number of commercial sources. A "router" as used herein may refer to any sort of conventional router device, or to any sort of gateway, firewall, wireless access point, network switch, bridge and/or the like. In the exemplary embodiment shown in FIG. 1, router 116 may represent a firewall or other device that connects home network 105 with WAN 111 (e.g., via a cable or digital subscriber line (DSL) modem). Another router (e.g., router 122 in FIG. 1) could represent a wireless access point (WAP) or other gateway to a wireless network, such as any sort of IEEE 802.11 ("WI-FI") or other wireless network. Routers 118 and/or 120 are shown in FIG. 1 to inter-connect additional wired or wireless networks within home network 105 as appropriate. Equivalent embodiments may include numbers and/or types of routers that differ from the example illustrated in FIG. 1. Such routers may be arranged to interconnect any number of local area or other sub-networks within home network 105 in any other topology or other arrangement that differs from that shown in FIG. 1.

Clients 110, 112 and server 114 represent any types of conventional network nodes capable of communicating on network 105. In various embodiments, clients 110 and 112 attempt to contact server 114 to obtain data or services, as appropriate. Clients 110, 112 may therefore be implemented using any sort of network client device, such as any sort of computer system, mobile phone, personal digital assistant, network-enabled display, network-enabled television and/or the like. In a media placeshifting application, for example, clients 110 and 112 may be implemented using media players that would attempt to contact a placeshifting server 114 to obtain a stream of placeshifted media content over network 105. Placeshifting server 114 may be similarly implemented with any device capable of providing the requested media stream, such as any sort of dedicated placeshifting device, or any sort of set-top box (STB), television receiver, computer system or the like that provides media placeshifting services. Examples of conventional placeshifting functions, features, systems and structures are described in United States Patent Publication No. 2006/0095471, although the features described herein could be equivalently applied with any number of other techniques and structures in addition to those described in that particular publication. In other embodiments, clients 110, 112 and/or server 114 may attempt to contact each other for any other purposes other than placeshifting. Again, both clients 110, 112 and server 114 could represent any sort of conventional network nodes communicating on any sort of home network 105.

Generally speaking, a client or other node that attempts to contact a server typically needs to know an address and/or port number associated with the receiving device. If both devices reside on the same LAN, the devices can often discover each other with a simple LAN broadcast. If the communicating devices reside on different networks, however, broadcast techniques are significantly less effective. For client 110 to establish a connection to server 114 in FIG. 1, for example, packets from client 110 would typically be routed through at least router 122, router 118 and router 120 before reaching server 114. Similarly, communications from client 112 to server 114 in FIG. 1 would typically traverse router 118 and router 120. If clients 110 and 112 do not know an address, port number and/or other appropriate information associated with server 114, such communications could be very difficult to establish. Even if addressing information is available to initiate the connection, establishing the connection may be challenging without some sort of "hole punching" or similar assistance to facilitate connections across multiple LANs or other sub-networks within home network 105.

In various embodiments, client nodes communicating on WAN 111 are able to contact server 114 using a global mediation server 125 or a similar intermediary service. Typically, server nodes 114 contact the global mediation server 125 at a well-known uniform resource locator (URL) or other address to establish a connection using the user datagram protocol (UDP) or another appropriate protocol that can be routed on WAN 111. When a client (e.g., a client on WAN 111) later requests a connection to a server 114 that is in communication with the mediation server 125, the client and server can often simply exchange UDP (or other) parameters used to contact the mediation server 125 to communicate directly. This technique is commonly referred to as "UDP hole punching", and is often based upon conventional or proprietary network address translation (NAT) techniques. NAT is described, for example, in Internet RFC 3022, although other embodiments may use different techniques other than those described in that document.

"Hole punching" techniques based upon a global mediation server 125 can be less useful, however, when the client node 110, 112 and the server node 114 are located on separate LANs that both reside behind a common firewall, NAT server and/or other router (e.g., router 116). In particular, various types of mediation servers 125 will see the same address (e.g., 27.8.9.12 in the example of FIG. 1) for client 110, client 112 and server 114, even though these devices are each located on different networks behind router 116. Since a global mediation server 125 would see each of clients 110, 112 and server 114 at the same effective address, this common address would be of little use in conventional "hole punching" settings.

As noted above, communications between nodes operating on different LANs or other sub-networks within home network 105 may be established using one or more local mediation servers 106-108. In various embodiments, each node seeking to use the mediation services, such as client 110, 112 and server 114, suitably contacts registry 115 to obtain a list of local mediation servers 106-108 and/or global mediation server(s) 125 to establish an initial connection. The available mediation servers 106-108, 125 may be discovered by, for example, placing a query to registry 115 or the like. After establishing an initial connection to one or more mediation servers 106-108, 125, the originating node obtains address and/or other connection information about the initial connection. FIG. 1, for example, shows that client 110 has obtained connection information 127 from each of the local mediation servers 106-108, as well as global mediation server 125. Server 114 has similarly obtained connection information 128 from local mediation servers 106-108 and global mediation server 125.

"Connection information" may be in any format, and may be obtained in any manner. In various embodiments, connection information simply refers to addresses and/or port numbers that are used for communications on network 105. Network addresses may include, for example, conventional internet protocol (IP) addresses, ETHERNET or other network interface card (NIC) addresses, and/or any other addresses or identifiers used to communicate on network 105. Such information may be obtained, in some implementations, by transmitting conventional "BIND" requests to one or more mediation servers 106-108, 125. The BIND response provides, for example, the address and port number that are used by the service to contact the binding device or process. The global mediation server 125, for example, would typically contact both client no and server 114 using a port on router 116, which is accessible at address "27.8.9.17" in the example of FIG. 1. Mediation server 108 would typically address client no by its actual network address (e.g., "10.6.1.3" in the example of FIG. 1), whereas server 114 would be accessed via a port on router 118 (e.g., "10.6.1.3" in FIG. 1). Although port numbers are not shown in network information 127 and 129 in FIG. 1, port numbers would typically be provided in response to a conventional BIND request in conjunction with IP or other network addresses. As noted below, this network information 127, 129 can be exchanged between the client no and/or server 114 in support of "hole punching" or other connection techniques.

Various embodiments may also assist a user or administrator in placing one or more mediation servers 106-108 within network 105 as appropriate. As described more fully below (e.g., in connection with FIG. 3), hole punching may be most successful when the mediation server is located on a common network that is relatively close to both connecting nodes. To establish connections between client 110 and server 114 in FIG. 1, for example, it may be most desirable to place the mediating server on a LAN that is relatively close to both nodes but that uses separate addresses to communicate with the two nodes. One way to identify such a network is to obtain network path information (e.g., "TRACEROUTE" information) from each of the two nodes to a common destination. The common destination may be, for example, a node or service on WAN 111 that is accessible at a known address. By tracing the network route to the common destination, overlapping portions of the network path can be readily identified, thereby aiding in the placement of mediation servers 106-108. FIG. 1, for example, shows exemplary routing information 129, 130 describing the paths from client no and server 114 (respectively) to a server or other host on WAN 111. As described more fully below, such information 129, 130 may be helpful in identifying and selecting locations for mediation servers 106-108.

Turning now to FIG. 2, an exemplary process 200 to facilitate communications connections between any two nodes on network 105 is shown. The example illustrated in FIG. 2 shows client 110 establishing a connection with server 114 using local mediation server 106 and global mediation server 125, although other embodiments may use equivalent principles to establish connections between any types of nodes on network 105 using any number of local mediation servers 106-108 and/or global mediation servers 125 as desired. FIG. 2 shows various processes and functions that may be carried out by the various devices and systems operating within system 100. Many of these functions may be carried out using conventional software or firmware executing on any processor, and stored in any sort of memory or mass storage within the executing device, as appropriate. Communications between the various components shown in FIG. 2 may be provided over any appropriate portion of home network 105 and/or WAN 111 using any sort of appropriate interfaces and protocols as desired.

In various embodiments, each mediation server (e.g., local mediation servers 106-108 and global mediation server 125 in FIG. 1) initially registers with a central registry 115 that allows clients 110/112, servers 114 and other nodes to identify and locate potential mediation services that may be available. Functions 202 and 204 in FIG. 2, for example, represent communications sent from mediation servers 106 and 125, respectively, to registry 115. Such communications may contain any information sufficient to identify the particular server 106-108, 125, including any sort of name, server ID or other identifiers. Messages 202, 204 may also provide any sort of IP or other network addresses used by servers 106-108, 125, and this information may be stored at registry 115 as appropriate. As noted above, registry 115 is any server, host or other service on WAN 111 or another location that is accessible to the various nodes requesting connections. To that end, registry 115 may be any sort of database server or the like that is capable of receiving and storing information contained in registration messages (e.g., functions 202, 204) received from any number of mediation servers 106-108, 125. In various embodiments, registry 115 stores information about the mediation servers 106-108, 125 according to the WAN addresses of the registration requests 202, 204. Mediation servers 106-108 that provide registration messages 202, 204 that are received via the same WAN address can be assumed to be located behind the same firewall, gateway or other router 116, as appropriate. In the exemplary network 105 of FIG. 1, clients 110 and 112, server 114 and message servers 106-108 will appear on WAN 111 using address "27.8.9.17". This address may therefore be used by registry 115 or other services on WAN 111 to associate different entities operating on the same home network 105, as appropriate.

Registry 115 is also capable of providing information about the registered servers in response to subsequently-received queries. In various embodiments, server 114 queries (function 206) the registry 115 at startup or at any other appropriate time to identify available mediation servers 106-108, 125. In various embodiments, registry 115 identifies the appropriate mediation servers 106, 107 as including those servers that are present within a common home network 105 as the particular node requesting the information. Global mediation server 125 may also be identified as an appropriate server for some connections. The appropriate mediation servers 106-108, 125 are then identified in a response message (function 208) that is returned to the server 114 from the registry 115. Local mediation servers 106-108 may be identified, for example, according to the WAN addresses used to deliver registration messages 202, 204 mentioned above. That is, mediation servers 106-108 that provided registration messages 202, 204 from the same WAN address that provides query 206 may be readily assumed to be part of the same home network as the server 114.

Server 114 then attempts to establish a persistent connection with each of the identified mediation servers 106-108, 125 as appropriate (functions 210, 212). "Persistent" in this context refers to any connection that remains established and maintained even when little or no data is being sent via the connection. As an example, the connections 210, 212 established between each server 114 and each mediation server 106-108, 125 may be transmission control protocol (TCP) or other reliable connections that can be established over network 105. In various embodiments, TCP or similar connections are relatively easy to establish (at least in comparison to user datagram protocol (UDP) or similar messages) because most firewalls and other routers will allow devices to establish TCP connections more readily than the less-reliable UDP connections. Moreover, TCP connections can be maintained using relatively low-overhead "keepalive" messages that allow the connection to be kept in place even when little or no active communication is occurring. As a result, message servers may be able to maintain any number of active connections 210, 212 to any number of server devices 114 without incurring excessive overhead.

In the exemplary network 105 shown in FIG. 1, server 114 may receive addresses associated with local mediation servers 106, 107 and 108 from registry 115, since each of these servers are behind the same WAN firewall or other router 116 as server 114. Server 114 may attempt to contact each server 106-108 (as well as global server 125) to establish persistent connections, but may not be successful in all cases. In the example of FIG. 1, for example, server 114 may be unable to establish a connection with mediation servers 107 and 108, even though these mediation servers may be identified in response 208 from registry 115. Other embodiments, however, may be able to provide connections traversing any number of different networks and topologies, as desired.

Client 110 also queries the registry 115 (function 214) to identify available mediation servers 106-108, 125. Registry 115 appropriate responds to queries from client nodes by providing a reply message (function 216) that identifies appropriate mediation servers 106-108, 125 and/or that provides addresses or other information that allows the requesting client to locate and/or communicate with the identified servers via network 105. As with server 114, registry 115 may identify local mediation servers 106-108 as those servers with WAN addresses that correspond to the WAN address that provides query 214 to registry 115.

To establish a connection from a client no to a server 114, for example, client no first attempts to bind or otherwise connect to some or all of the identified mediation servers (functions 218, 222) to obtain connection information that can be provided to the server 114. These attempts 218, 222 to create connections to the mediation servers 106, 125 may use TCP, UDP and/or any other protocols as appropriate. If successful, each bind attempt 218, 222 will generate a response message (functions 220, 224, respectively) that contains an address and port number and/or any other connection information associated with the requesting client no as appropriate. In various embodiments, a conventional "bind" attempt 218, 222 will produce a response 220, 224 that includes connection information (e.g., an IP address and port number) that the server 114 uses to communicate with the requesting client using the appropriate protocol. Connection information 127 in FIG. 1, for example, shows several examples of addresses that may be returned in response to connection requests sent to various mediation servers 106-108, 125. In the exemplary network 105 shown in FIG. 1, server 114 may be able to establish connections with local mediation server 106 and with global mediation server 125. Mediation servers 107-108, while visible to client 110, may not be readily visible to server 114, thereby preventing their use in some connection attempts. Client 110 may nevertheless attempt to contact mediation servers 107, 108 for certain connections, as desired. Other embodiments may process different types or amounts of connection data from any number of local and/or global mediation servers, as appropriate.

In many embodiments, client 110 requests a connection with the desired server 114 by sending requests 226, 227 to each of the available mediation servers 106-108, 125. Requests 226, 227 suitably include the connection information 127 obtained from the successful bind requests 218, 222 made by client 110. The connection information 127 therefore provides a list of bind information (e.g., addresses and port numbers), as well as the identities of the server(s) 106-108, 125 that provided the bind information. Alternate embodiments may provide any other information that can be used to establish a TCP, UDP and/or other connection with client 110 on network 105. Requests 226, 227 typically also identify the intended server 114 by device ID, device name, IP or other network address, or any other identifier.

If one or more mediation servers 106, 125 have persistent connections 210, 212 in place with the identified server 114, then the server 114 can be contacted via the established connection. The mediation servers 106, 125 that have pre-established connections 210, 212 then each send the connection information 127 provided by the client 110 to the server 114 (functions 228, 229). Connection information 127 may be delivered to the server 114 by simply forwarding the connection request 226, 227 received from the client 110 via the persistent connection 210, 212 in some embodiments. Alternately, mediation servers 106, 107 may re-format or otherwise re-transmit communication information 127 in a new message or frame, as desired. In various embodiments, client 110 repeats bind request and response messaging (e.g., messages 218-224) with each available mediation server 106-108, 125 on a periodic or other basis until the client 110 receives an appropriate response.

When server 114 receives one or more connection requests 228, 229 via connections 210, 212, the server suitably attempts to obtain its own set of connection information 128 by binding or otherwise attempting to connect with one or more mediation servers 106, 125 (functions 230, 234). In various embodiments, server 114 attempts to connect to each mediation server 106, 125 that is known to the server 114 and that is identified in the connection information 127 supplied by the requesting client 110. Other embodiments may connect 232, 234 to the mediation server(s) 106, 125 that delivered the connection information 127 from the client 110. Still other embodiments may attempt to connect with one or more known preferred mediation servers, to all of the mediation servers known to the server 114, or to any other set of mediation servers as desired. For each successful connection 230, 234 to a mediation server 106, 125, server 114 suitably receives a response 232, 236 that contains connection information (e.g., IP address and port number information) used by the mediation server 106, 125 for the connection to server 114.

After responses 232, 236 are received, server 114 has a listing of connection information 128 that can be used to identify commonality with connection information 127 received from client 110. Connection information 127 and 128 may then be processed as appropriate to select a suitable opportunity for "hole punching" or otherwise establishing a connection between client 110 and server 114 (function 238). Although FIG. 2 shows function 238 as occurring at the server 114, other embodiments may select the connection details at client 110, at one or more mediation servers 106, 125, and/or at any other location.

In some embodiments, server 114 simply responds (function 240) to each of the connection requests 228, 229 that were received by providing the full listing of connection information 128. This would allow the client 110, mediation server(s) 106, 125 and/or any other intervening node to select a connection address that would support "hole punching" or other connection attempts.

In other embodiments, server 114 selects one or more mediation servers to support the connection 242. The particular server may be chosen from any available servers (e.g., server 106, server 125) based upon connection information 127, 128. In various embodiments, connection information 127 is compared to connection information 128 to identify common addresses. Generally speaking, if a common address (e.g., "27.8.9.17" in the example of FIG. 1) appears on both lists, this address would indicate that a common router (e.g., router 116 in FIG. 1) directs communications to both nodes 110 and 114, thereby making that address less likely to support successful connections. Conversely, if a mediation server contacts the two nodes 110, 114 using two different addresses on the same network (e.g, in the example of FIG. 1, message server 106 contacts client 110 at address "10.11.5.5" and server 114 at "10.11.5.6"), this could be indicative of an appropriate mediation opportunity. If multiple opportunities are identified, any sort of priority rules could be applied, as desired. If traceroute information (e.g., information 129-130 in FIG. 1) is available, for example, then mediation servers that logically reside closer to a WAN gateway (e.g., router 116 in FIG. 1) may be prioritized in some embodiments over mediation servers that are closer to one node or the other. Again, any number of prioritization and/or tie-breaking rules may be applied in any manner.

Server 114 therefore sends at least one response 240 to the selected mediation server (e.g., server 106 in the example of FIG. 2) that includes some or all of the server's connection information 128. The selected mediation server 106 suitably forwards some or all of the received information (function 241) to the client 110. At that point, both the client 110 and the server 114 have current connection information 127, 128 about each other, so "hole punching" or other attempts to establish a direct connection 242 can proceed. In various embodiments, client 110 transmits a packet or other message to the address and port number associated with server 114 in message 241 to thereby establish direct communications 242. Server 114 may also send one or more packets to the address and port number associated with client 110 in messages 228 and/or 229. One example of a technique that could be used to establish a connection between client 110 and server 114 after address information is exchanged is described in U.S. patent application Ser. No. 12/405,039 filed on Mar. 16, 2009 and entitled "MEDIATED NETWORK ADDRESS TRANSLATION TRAVERSAL". Other embodiments may proceed using other connection techniques as desired.

The general techniques and principles described in connection with FIG. 2 may be modified or supplemented in any number of equivalent embodiments. The roles of client 110 and server 114 described herein may be reversed, for example, so that the persistent connections 210, 212 are established with the client 110 and server 114 places the initial connection requests to the mediation server(s) 106, 107. Other functions may be added to the exemplary process 200 shown in FIG. 2, and/or the various functions shown may be modified in any manner. The various tasks and functions of process 200 may be executed in any temporal order, using any numbers and/or types of clients 110, servers 114 and/or mediation servers 106, 108.

As noted above, any number of local mediation servers 106-108 may be provided at any physical and logical location within network 105 that allows communication with the clients 110, 112, servers 114 and/or any other nodes that are attempting to establish mediated communications. In some embodiments, a suitable location for a local mediation server 106 may be determined by analyzing traceroute or other network path information, as appropriate. Network paths from two or more different nodes to an Internet service or other well-known address can be obtained, for example, and processed to identify overlapping paths used by the different nodes to communicate with a network server or other common node. This common path information can be further used to recognize a common network (e.g., a common LAN) that could provide a suitable location for a local mediation server that would facilitate communication between the different nodes. Again, different embodiments may make use of any number of local mediation servers 106-108 that are present at any physical or logical locations, as appropriate; such locations may be determined in any manner.

Turning now to FIG. 3, an exemplary method 300 for determining a location for a mediation service suitably includes the broad functions of obtaining routing information from a first node to a known address (function 302), obtaining routing information from a second node to the known address (function 304), comparing the routing information from the first node and the second node (function 306) to identify a common network (function 308), and providing an output that indicates the common network as the location for the mediation service (function 308). The various functions shown in FIG. 3 may be carried out in software or firmware that is stored in any memory (e.g., memory 136 in FIG. 1) or other storage medium, and that is executed by any sort of processor (e.g., processor 134 in FIG. 1). The various processing steps may be executed by a server 114, by a client 110/112, by a router or other network device, by a mediation server 106-108, 112, and/or by any server or other host operating within network 105 and/or WAN 111, including registry 115 and/or global mediation server 125 in some embodiments. The particular means used to implement each of the various functions shown in FIG. 3, then, could be any sort of processing hardware executing conventional software or firmware logic that implements any of the processes, routines, algorithms and/or other functions described herein. The various structures that are able to execute the various functions shown in FIG. 3 may therefore vary widely from embodiment to embodiment.

Routing information may be obtained from any two nodes operating within home network 105 in any manner (functions 302, 304). In various embodiments, the routing information is simply TRACEROUTE or similar data such as information 129, 130 in FIG. 1. This information may be obtained, for example, by executing a conventional TRACEROUTE command to track the path from a client 110/112, server 114 or another node to a server or other host operating at a known address. "Obtaining" path information 302, 304, then, may involve executing a traceroute or similar instruction to locally determine path information 129, 130 in some implementations. Other implementations may "obtain" such information 129, 130 by receiving information that was obtained from another node. A server 114, for example, may obtain its own path information 130 by executing a traceroute command to a particular host and may also obtain information 129 from a client 110 or other node using conventional messaging techniques.

Path information 129, 130 obtained from the two nodes may be compared or otherwise processed in any manner (function 306). In various embodiments, the two paths identified in information 129, 130 are compared with each other to identify common nodes. In the example shown in FIG. 1, for example, information 129 and 130 both show a path through router 116, as indicated by the common addresses "10.11.5.1". Path addresses after this node (e.g., "27.8.9.x" and any ensuing addresses in WAN 111) would also be common to both information 129 and 130, thereby indicating a common path behind router 116.

This commonality, then, can be used to identify a common network (function 308). The first common address from information 129, 130, for example, indicates the closest common point to both nodes. In the example of FIG. 1, the closest common address in information 129 and 130 is "10.11.5.1", indicating that the 10.11.5.x network provides a common path for both client 110 and server 114. Generally speaking, this network would provide a suitable location for a mediation server (e.g., mediation server 106) that could facilitate connections between the two nodes. Other embodiments may identify common networks using techniques other than those described herein.

The identified network may be reported to an administrator or other user in any manner (function 310). Results may be provided to a web browser or other client application executing on any computer system, for example. Other embodiments may perform process 300 in a set top box or other television receiver that may present results on the user's television or other display. Still other embodiments may transmit results to a customer service representative or customer service website that provides the results to the customer or other user as appropriate.

Various systems, devices and techniques for facilitating connections between clients and servers on a home network have been described. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

The term "exemplary" is used herein to represent one example, instance or illustration that may have any number of alternates. Any implementation described herein as exemplary is not necessarily to be construed as preferred or advantageous over other implementations.

What is claimed is:

1. A method executable by a mediation server to facilitate sharing of network addresses between a client and a server, the method comprising:
   initially establishing a persistent connection between the mediation server and the server;
   maintaining the persistent connection as an active connection even when no data is being transferred between the mediation server and the server;
   after the persistent connection between the mediation server and the server has been established, receiving a request for a connection to the server from the client at the mediation server, wherein the request comprises first connection information comprising at least one client network address associated with the client;
   sending the first connection information from the mediation server to the server via the persistent connection that was previously established prior to receiving the request for the connection;
   receiving a response from the server at the mediation server, wherein the response comprises second connection information comprising at least one server network address associated with the server; and
   sending the second connection information about the server from the mediation server to the client to thereby allow a direct connection between the client and the server to be established using the at least one client network address and the at least one server network address.

2. The method of claim 1 wherein the mediation server is one of a plurality of mediation servers, and wherein the first connection information comprises a first plurality of network addresses, wherein each of the first plurality of network addresses associates the client with one of the plurality of mediation servers, and wherein the second connection information comprises a second plurality of network addresses, wherein each of the second plurality of network addresses associates the server with one of the plurality of mediation servers.

3. The method of claim 1 further comprising:
   receiving a first bind request from the client prior to receiving the request for a connection to the server from the client; and
   responding to the first bind request with a particular network address associated with the client, and wherein the first connection information received by the mediation server comprises the particular network address associated with the client.

4. The method of claim 3 wherein the responding to the first bind request comprises responding with a port number associated with the client, and wherein the first connection information comprises the port number associated with the client.

5. The method of claim 3 further comprising:
   receiving a second bind request from the server after sending the first connection information associated with the client to the server; and
   responding to the second bind request with a network address associated with the server, and wherein the second connection information comprises the network address associated with the server.

6. The method of claim 1 wherein the persistent connection is a transmission control protocol (TCP) session that is established responsive to a message received from the server at the mediation server prior to receiving the request from the client.

7. The method of claim 1 wherein the client resides on a first local area network and the server resides on a second local area network different from the first local area network.

8. The method of claim 7 wherein the client and the server are each coupled to a wide area network via a common local area network, and wherein the mediation server resides on the common local area network.

9. The method of claim 7 further comprising obtaining first routing information from the client, obtaining second routing information from the server, identifying a common network from the first and second routing information, and providing an output that indicates the common network.

10. A computer system to establish communications between a client and a server over a network, the computer system comprising:
   an interface to the network, the interface comprising a hardware interface that physically couples to the network; and
   a processor comprising a hardware processing chip in communication with the interface, wherein the processor is configured to initially establish a persistent connection with the server via the interface and to maintain the persistent connection as an active connection even when no data is being transferred between the mediation server and the server, and, after the persistent connection is established, to receive a request for a connection to the server, wherein the request is received via the interface from the client and wherein the request comprises first connection information including at least one client network address associated with the client, and wherein the processor is further configured to send the first connection information to the server via the persistent connection, to receive a response from the server via the interface that comprises second connection information including at least one server network address associated with the server, and to send the second connection information to the client via the interface to thereby allow a direct connection between the client and the server to be established using the at least one client network address and the at least one server network address.

11. The computer system of claim 10 wherein the first connection information comprises a first plurality of network addresses, wherein each of the first plurality of network addresses associates the client with one of a plurality of mediation servers, and wherein the second connection information comprises a second plurality of network addresses, wherein each of the second plurality of network addresses associates the server with one of the plurality of mediation servers.

12. The computer system of claim 11 wherein the processor is configured to receive a first bind request from the client prior to receiving the request for a connection, to respond to the first bind request with a particular client network address associated with the client, to receive a second bind request from the server after sending the first network address to the server and to respond to the second bind request with a particular server network address associated with the server, wherein the first connection information comprises the particular client network address associated with the client and the second connection information comprises the particular server network address associated with the server.

13. The computer system of claim 11 wherein the client resides on a first local area network and the server resides on a second local area network different from the first local area network, and wherein the first and second local area networks are each coupled to a wide area network via a common local area network, and wherein the interface is configured to establish the system as a node on the common local area network.

14. The computer system of claim 11 wherein the client resides on a first local area network and the server resides on a second local area network different from the first local area network, wherein the first and second local area networks are each coupled to a wide area network via a common local area network, and wherein the processor is further configured to obtain first routing information from the client, to obtain second routing information from the server, to identify the common local area network from the first and second routing information, and to provide an output that indicates the common local area network.

15. A method executable by a server to facilitate communications with a client, the method comprising:
initially establishing a plurality of persistent connections, wherein each of the persistent connections is established with one of a plurality of mediation servers;
maintaining each of the plurality of persistent connection as active connections even when no data is being transferred;
receiving a request for a connection via at least one of the plurality of previously-established persistent connections, wherein the request comprises first connection information comprising at least one client network address associated with the client;
responsive to the request, sending an address request to each of the plurality of mediation servers;
receiving from each of the plurality of mediation servers a server network address that identifies the server to the mediation server; and
sending a response to at least one of the mediation servers, wherein the response comprises each of the server network addresses that are obtained from the plurality of mediation servers to thereby allow the mediation server to forward each of the server network addresses to the client and to thereby allow the client and the server to establish a direct connection using the at least one client network address and at least one of the server network addresses.

16. The method of claim 15 wherein the first connection information comprises a listing of client addresses associated with the client from each of the plurality of mediation servers.

17. The method of claim 16 further comprising selecting one of the at least one of the mediation servers to receive the response based upon the listing of client addresses and the at least one network address.

18. The method of claim 16 wherein the sending comprises sending the response to each of the at least one of the mediation servers.

19. The method of claim 16 wherein the client resides on a first local area network and the server resides on a second local area network different from the first network, wherein the first and second local area networks are each coupled to a wide area network via a common local area network, and wherein the method further comprises obtaining first routing information describing a first path from the client to a service on the wide area network, obtaining second routing information describing a second path from the server to the service on the wide area network, identifying the common local area network from the first and second routing information, and providing an output that indicates the common local area network.

20. The method of claim 16 wherein the client resides on a first local area network and the server resides on a second local area network different from the first network, wherein the first and second local area networks are each coupled to a wide area network via a common router having a wide area network address on the wide area network, and wherein the method comprises providing a request message to a registry and obtaining information about the plurality of mediation servers from the registry, and wherein at least one of the plurality of mediation servers is identified by the registry as using the same wide area network address as the server.

* * * * *